United States Patent [19]

Hrovat et al.

[11] Patent Number: 5,303,794
[45] Date of Patent: Apr. 19, 1994

[54] WHEEL SPIN CONTROL USING ELECTRONICALLY CONTROLLED CLUTCHES AND ENGINE CONTROLS

[75] Inventors: Davorin D. Hrovat, Dearborn, Mich.; Jeremy J. Main, Kent, Great Britain

[73] Assignee: Ford Motor Company, Dearborn, Mich.

[21] Appl. No.: 808,834

[22] Filed: Dec. 17, 1991

[51] Int. Cl.$^5$ .............................................. B60K 28/16
[52] U.S. Cl. .................................. 180/197; 74/336 R; 192/3.58; 364/424.1; 364/426.03
[58] Field of Search ............... 180/197, 338, 339, 345; 364/424.1, 426.02, 426.03; 74/336 R, 330; 192/358

[56] References Cited

U.S. PATENT DOCUMENTS

| | | | |
|---|---|---|---|
| 4,046,032 | 9/1977 | Braun et al. | 74/865 |
| 4,376,473 | 3/1983 | Tomasek et al. | 192/3.58 |
| 4,519,484 | 5/1985 | Nagaoka et al. | 192/3.58 |
| 4,615,425 | 10/1986 | Kobayaski et al. | 192/0.076 |
| 4,765,450 | 8/1988 | Kurihara et al. | 192/0.052 |
| 4,768,608 | 9/1988 | Hrovat | 180/197 |
| 4,790,418 | 12/1988 | Brown et al. | 192/0.032 |
| 4,799,160 | 1/1989 | Arbeille et al. | 364/424.1 |
| 4,860,607 | 8/1989 | Numazawa et al. | 74/330 |
| 4,884,667 | 12/1989 | Koga | 192/355 |
| 5,020,622 | 6/1991 | Hrovat | 180/197 |
| 5,047,940 | 9/1991 | Onaka et al. | 180/197 |
| 5,060,746 | 12/1991 | Nobumoto et al. | 180/197 |
| 5,184,577 | 2/1993 | Kato | 180/197 |

FOREIGN PATENT DOCUMENTS

| | | | |
|---|---|---|---|
| 0128948 | 8/1983 | Japan | 180/197 |
| 0048408 | 8/1984 | Japan | 180/197 |

Primary Examiner—Margaret A. Focarino
Assistant Examiner—A. M. Boehler
Attorney, Agent, or Firm—Roger L. May; Allan J. Lippa

[57] ABSTRACT

A system and method for reducing wheel spin of a vehicle on slippery surfaces wherein the wheel spin is reduced by regulating the engagement of the clutches in a multiple clutch transmission of the vehicle. Upon detection by a controller of an abrupt acceleration by a driven wheel, the controller partially engages the transmission clutch which is currently disengaged, thus increasing the load on the engine and reducing the wheel spin while maintaining the drive train torque path through the previously engaged transmission clutch. Additionally, engine output is decreased upon detection of wheel spin to reduce the wear on the partially engaged clutch.

25 Claims, 3 Drawing Sheets

WHEEL SPIN CONTROL USING ELECTRONICALLY CONTROLLED CLUTCHES AND ENGINE CONTROLS

BACKGROUND OF THE INVENTION

The present invention relates generally to wheel spin control of a motor vehicle and, more particularly, to a system and method for controlling wheel spin of a vehicle by controlling the operation of the clutches in a multiple clutch transmission.

Surface conditions of roadways are prone to vary unexpectedly. When a vehicle encounters a slippery surface, engine torque applied to a driven wheel may cause the wheel to abruptly accelerate or spin and result in a temporary loss of vehicle control. Faced with such a situation, usually an operator of the vehicle will quickly reduce wheel speed to thereby stop the spin of the driven wheel and maintain control of the vehicle. Unfortunately, operators lack the ability to control wheel spin and oftentimes lose control of the vehicle.

Various techniques have been proposed to assist a vehicle operator by preventing wheel spin on slippery surfaces. For example, U.S. Pat. No. 4,768,608 discloses a system for controlling wheel slip of a vehicle by reducing the output torque of the engine when wheel slip is detected. Wheel slip of the vehicle is detected by measuring the difference in speed between a driven wheel and a non-driven wheel and comparing this calculated difference to a preset value. The engine intake manifold pressure of the vehicle is also monitored and a composite control signal is produced from the sum of the wheel slip and manifold pressure signals. In response to the composite control signal, the engine throttle is reduced, thereby reducing the output torque of the engine. A problem with this approach is that the transient response time of the above control system is limited by the time delay associated with reducing the engine torque and transmitting engine torque through the drive train and wheels.

In commonly assigned U.S. Pat. No. 5,020,622, wheel spin is reduced by controlling the slip rate of an electronically controlled, hydraulically operated clutch. Wheel spin is detected by comparing the speed of a driven wheel to the speed of a non-driven wheel. In response to feedback signals indicative of detected wheel spin and hydraulic pressure being applied to a clutch driving the driven wheel, the clutch hydraulic pressure is regulated to increase the clutch slip rate. The increased clutch slip rate reduces the torque transferred from the engine to the driven wheel, thus reducing wheel spin. Additionally, the engine speed is adjusted in response to the wheel spin feedback signal to prevent over-revving of the engine and maintaining a positive torque on the driven wheel while the clutch is being slipped. Since the clutch being slipped is transferring torque from the engine to the driven wheel, the slip rate of the clutch must be precisely controlled to ensure that the torque path from the engine to the driven wheel is not interrupted. Unfortunately, relatively complex circuitry is required to precisely control the slip rate of the clutch.

Accordingly, there is a need for an efficient and less complex vehicle wheel spin control system which maintains the drive train torque path while reducing the wheel spin of the vehicle.

SUMMARY OF THE INVENTION

This need is met by a system and method in accordance with the present invention for controlling the wheel spin of a vehicle on slippery surfaces wherein the wheel spin is reduced by regulating the engagement of the clutches in a multiple clutch transmission of the vehicle. Upon detection of an abrupt acceleration by a driven wheel, the clutch which is currently disengaged is partially engaged, thus increasing the load on the engine and reducing the wheel spin while maintaining the drive train torque path through the previously engaged transmission clutch.

In accordance with one aspect of the present invention, a system is provided for controlling wheel spin of a vehicle having a multiple clutch transmission including first and second gear means and first and second clutch means. The first gear means transfers the torque from the engine to at least one driven wheel of the vehicle when the first clutch means is engaged and the second gear means similarly transfers the torque when the second clutch means is engaged. A first sensor means monitors the driven wheels and generates a spin signal indicative of wheel spin. First and second gear means are monitored and gear signals are generated indicative of the operation of one of the first and second gear means. Since the operation of the first and second gear means directly corresponds to the operation of first and second clutch means, respectively, the gear signals are also indicative of the engagement of one of the first and second clutch means. A controller means responsive to the gear signals and the spin signals partially engages the one of the first and second clutches which is not transferring the torque from the engine to the driven wheels, thereby increasing load torque on the engine and reducing wheel spin. The controller means may preferably include a first solenoid for partially engaging the first clutch means and a second solenoid for partially engaging the second clutch means in response to a pulse width modulated signal.

Preferably, the wheel spin control system further comprises a second sensor means for monitoring the engine and generating signals indicative of an operating condition of the engine. A means for controlling the engine in response to the spin signals and the engine signals is provided to regulate an operating condition of the engine and thereby reduce wheel spin. Means for controlling the engine may comprise an electronically-controlled throttle, a spark advance system, an injection pulse width control system or any combination of the above controls. An advantage of this particular aspect of the present invention is that the engine torque is decreased during the partial engagement of the clutch, thus reducing the wear on the partially engaged clutch.

The wheel spin control system may preferably further comprise timer means coupled to the controller means for disengaging the one of the first and second clutch means which is partially engaged after a predetermined period of time of partial engagement. This feature of the present invention reduces the wear on the partially engaged clutch means. Alternatively, the wheel spin control system may further comprise a thermal means coupled to the controller means which monitors the temperature of the partially engaged clutch means and disengages the partially engaged clutch means upon reaching a predetermined temperature. This feature of the present invention also reduces the wear on the partially engaged clutch means.

Additionally, the first sensor means of the present invention may further provide for monitoring at least one nondriven wheel of the vehicle. The controller means generates a spin signal proportional to the difference between the average rotational speed of the driven wheels and the average rotational speed of the nondriven wheels to determined wheel spin. Further, the controller means may provide for comparing the spin signal and a predetermined maximum spin value and for partially engaging the one of the first and second clutch means which is not engaged upon the spin signal exceeding the predetermined maximum spin value.

A pressure sensor means for monitoring hydraulic pressure being applied to the first and second clutch means may be provided by the wheel spin control system of the present invention. The pressure sensor means generates a pressure signal indicative of the monitored hydraulic pressure. The pressure signal is then used by the controller means for partially engaging the one of the first and second clutch means which is not engaged when wheel spin occurs.

In accordance with another aspect of the present invention, a wheel spin control system is provided for controlling the wheel spin of a vehicle having a multiple clutch transmission which includes at least first and second clutch means, and at least one wheel driven through the transmission. A first sensor means monitors the at least one driven wheel and generates a spin signal indicative of wheel spin. A gear indicator means is provided for monitoring the transmission and for generating gear signals indicative of the currently operational gear of the transmission driving the driven wheel. The gear signals and the spin signals are received by a controller means which partially engages the first and second clutch means when the spin signal indicates wheel spin to increase load torque on the engine and thereby reduce wheel spin.

In accordance with yet another aspect of the present invention, a method for controlling wheel spin of a vehicle having an engine, a multiple clutch transmission including first and second gear means and first and second clutch means, and wheels driven though one of the first and second gear means and one of the first and second clutch means is provided. When engaged, the first clutch means transfers torque from the engine to the driven wheels through the first gear means. Similarly, the second clutch means, when engaged, transfers torque from the engine to the driven wheels through the second clutch means. The method of the present invention comprising the steps of: generating spin signals indicative of wheel spin; generating gear signals indicative of operation of one of the first and second gear means and thereby the engagement of one of the first and second clutch means; and partially engaging the other one of the first and second clutch means which is not currently engaged in response to the spin signals and the gear signals to increase engine torque and thereby reduce wheel spin. Preferably, the method for controlling wheel spin of a vehicle further comprises the steps of: generating engine signals indicative of an operating condition of the engine and controlling the operating condition of the engine in response to the spin signals and the engine signals to reduce wheel spin. The operating engine operating condition being monitored may be engine RPM.

In accordance with still another aspect of the present invention, a method for controlling wheel spin of a vehicle having an engine, a multiple clutch transmission including first and second gear means and first and second clutch means, and wheels driven through one of the first and second gear means and one of the first and second clutch means is provided. The first gear means is operational when the first clutch means is engaged and the second gear means is operational when the second clutch means is engaged. The method of the present invention comprising the steps of: generating spin signals indicative of wheel spin; generating gear signals indicative of the currently operational gear of the transmission driving the wheels and thereby the engagement of one of the first and second clutch means; and partially engaging the first and second clutch means in response to the spin signals and the gear signals to increase load torque on the engine and thereby reduce wheel spin. Additionally, the method of the present invention may further comprise the steps of generating engine signals indicative of an operating condition of the engine and controlling the operating condition of the engine in response to the spin signals and the engine signals to reduce wheel spin.

It is thus an object of the present invention to provide a wheel spin control system and method which prevents wheel spin without interrupting the torque path from the engine to the wheels in an efficient and simplified manner. A further object of the present invention is to provide a wheel spin control system and method with a fast and stable response time which reduces wheel spin while minimizing the wear on the transmission clutches.

Other objects and advantages of the invention will be apparent from the following description, the accompanying drawings and the appended claims.

DETAILED DESCRIPTION OF THE INVENTION

Figure 1:
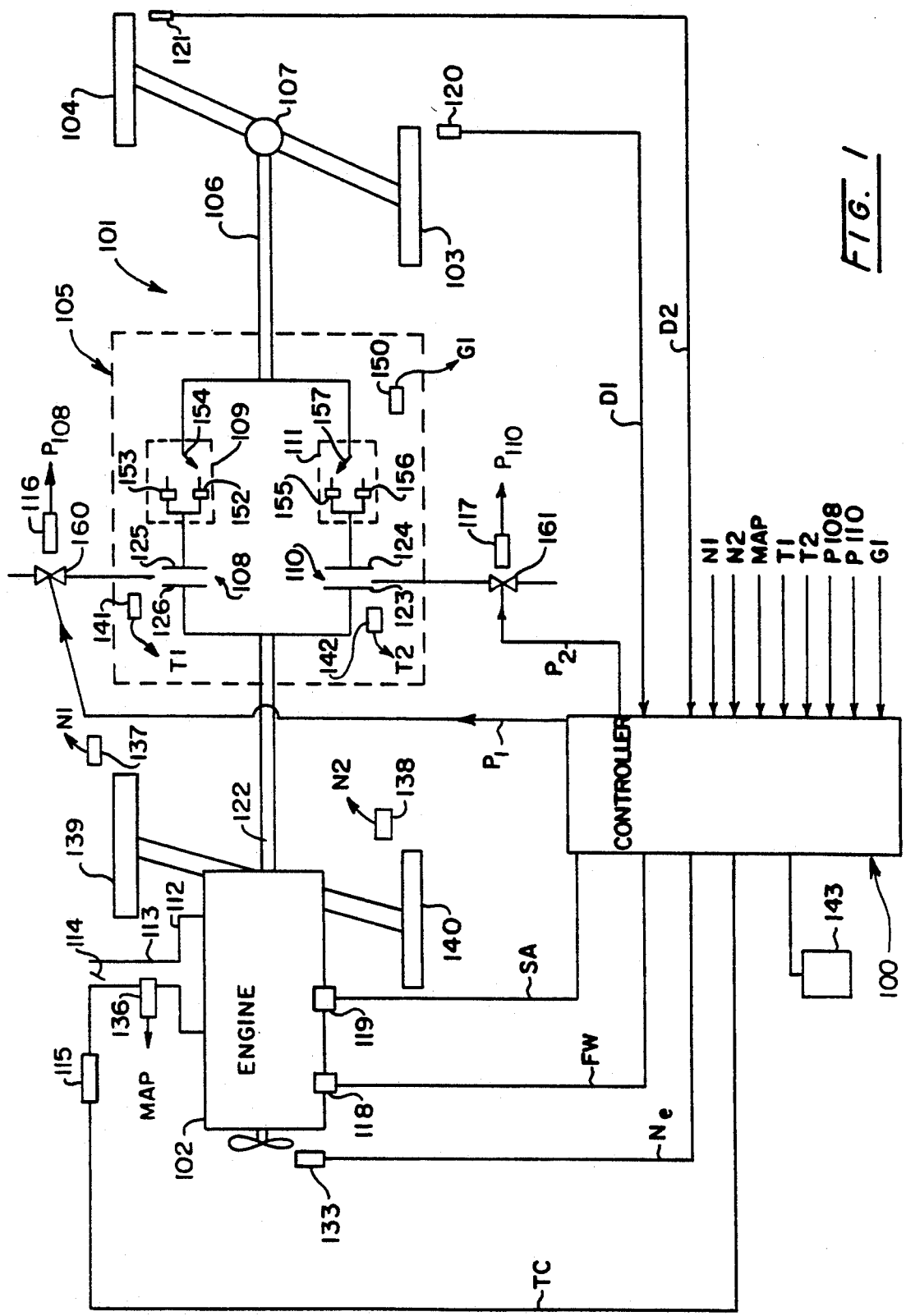
FIG. 1 shows a conventional motor vehicle controlled by the wheel spin control system of the present invention.

With reference to FIG. 1, controller means 100 is shown as receiving inputs from, and controlling, a motor vehicle 101 when wheel spin is detected. Motor vehicle 101 is shown in the illustrative embodiment as comprising an internal combustion engine 102 coupled to a multiple clutch transmission 105 via an engine output shaft 122. Transmission 105 is coupled to driven wheels 103 and 104 by a drive shaft 106 and a differential gear assembly 107. Transmission 105 comprises a first clutch means 108 coupled to the drive shaft 106 via a first gear means 109 and a second clutch means 110 coupled to the drive shaft 106 via a second gear means 111. Clutch means 108 and 110 are shown and described in more detail in U.S. Pat. No. 4,487,303 which issued to Boueri et al, is assigned to the assignee of the present application and is incorporated herein by reference.

The first gear means 109 comprise a first gear 153 and a third gear 152. A first gear selector switch 154 selectively connects the first gear 153 or the third gear 152 to the drive shaft 106 to change the gear ratio of transmission 105. Similarly, the second gear means 111 comprises a second gear 155 and a fourth gear 156 which are selectively connected to the drive shaft 106 by a second gear selector switch 157. The operation and construction of the transmission 105, including the first gear means 109 and the second gear means 111, is shown and described in greater detail in U.S. Pat. No. 4,519,484 which is incorporated herein by reference.

A speed ratio sensor 150 monitors the rotational speeds of the engine output shaft 122 and the drive shaft 106 and generates a signal G1 indicative of the currently operational gear of the transmission 105 in a well known manner. The signal G1 is received by the controller 100. Pressurized transmission fluid from a transmission pump (not shown) is supplied to the clutches 108 and 110 under the control of solenoids 160 and 161. Pressure transducers 116 and 117 generate pressure signals $P_{108}$ and $P_{110}$ representative of the hydraulic pressure being applied to the first clutch 108 and the second clutch 110, respectively. As may be readily appreciated, a torque converter (not shown) may be located between engine 102 and transmission 105 in a well known manner.

The engine 102 is illustrated in FIG. 1 as including an intake manifold 112 for inducting an air/fuel mixture into engine 102 via an air/fuel intake 113. Controller 100 generates a throttle control signal TC which is transmitted to a conventional throttle controller 115. Throttle controller 115 controls a throttle plate 114 to adjust the flow of the air/fuel mixture through the air/fuel intake 113 in a well known manner. A spark advance controller 119 responds to a spark advance signal SA from the controller 100 to provide the ignition timing and appropriate ignition spark to engine 102 in a conventional manner. A fuel controller 118 responds to fuel injection signal FW from the controller 100 to regulate the fuel being injected into the air/fuel intake 113. The components of the engine control system described above are well known in the art; therefore, they will not be further discussed herein.

Driven wheel sensors 120 and 121, comprising, for example, Hall effect or variable reluctance sensors, monitor the driven wheels 103 and 104 of the motor vehicle 101 and generate wheel speed signals D1 and D2 representative of the rotational speed of the driven wheels 103 and 104, respectively. Similarly, nondriven wheel sensors 137 and 138 monitor the nondriven wheels 139 and 140 of the motor vehicle 101 and generate wheel speed signals N1 and N2 which are proportional to the rotational speed of the nondriven wheels 139 and 140. The controller 100 receives the wheel speed signals D1, D2, N1, and N2 from their respective sensors. It should be apparent that the above designations of driven and nondriven wheels are exemplary and the present invention may be used to advantage with any combination of driven and nondriven wheels such as, for example, front wheel drive and four wheel drive vehicles.

The controller 100 is shown receiving an engine speed signal Ne which is proportional to the speed of the engine 102 from a sensor 133. Sensor 136 generates a pressure signal MAP which is proportional to the absolute pressure of intake manifold 112 and sends the pressure signal MAP to the controller 100. The controller 100 further receives the pressure signals $P_{108}$ and $P_{110}$ from the pressure transducers 116 and 117, which signals are proportional to the hydraulic pressure being applied to clutches 108 and 110 Controller 100 electronically actuates the solenoid valves 160 and 161 by signals $P_1$ and $P_2$ to control the clutches 108 and 110. It should be apparent to those skilled in the art, that clutches 108 and 110 may likewise be controlled by other well-known hydraulic systems.

As will be appreciated, the wheel spin control system described herein may be used to advantage with any type of internal combustion engine such as, for example, carburated engines, multiport fuel injected engines, centralized fuel injected engines and the like. Further, the wheel spin control system of the present invention is not limited to applications in automobiles, but may be used to advantage with any apparatus having an engine coupled to a driven wheel through a multiple clutch transmission.

Referring again to FIG. 1, the clutch 108 is shown including a clutch plate 126 coupled to the engine shaft 122 and a clutch plate 125 coupled via the gear means 109 to the drive shaft 106. The clutch 110 comprises a clutch plate 123 coupled to the engine shaft 122 and a clutch plate 124 coupled via the gear means 111 to the drive shaft 106 Although the clutches 108 and 110 are shown as electronically-controlled, hydraulically actuated clutches, the wheel spin control system of the present invention may be used to advantage with various types of clutches such as, for example, electro-magnetic clutches.

In one embodiment of the present invention, the clutch which is not engaged, i.e., the offline clutch, is partially engaged upon detection of wheel spin. As an example, assume that clutch 108 is engaged and transferring torque from the engine 102 to the driven wheels 103 and 104 via the gear means 109 and the first gear 153 during normal operation of the motor vehicle 101. Upon contacting a slippery surface, one or both of the driven wheels 103 and 104 abruptly accelerate and the speed (RPM) of the engine 102 suddenly increases. Wheel sensors 120 and 121 sense the acceleration of the driven wheel(s) and communicate this information to the controller 100 through signals D1 and D2. The controller 100 recognizes wheel spin if the difference between the driven and nondriven wheel speeds is greater than a predetermined value. Alternatively, the controller 100 may take the derivative of a driven wheel signal D1 or D2, which is equivalent to acceleration, and determined if the derivative exceeds a predetermined value. This technique is especially adaptable to four wheel drive vehicles, since each driven wheel can be monitored individually for wheel spin.

Upon recognition of wheel spin, the controller 100 partially engages the clutch 110 and instructs gear means 111 to engage a gear, either the second gear 155 or the fourth gear 156 in this example, that is higher than the currently operating gear, the first gear 153 of the gear means 109 in this illustration. If the transmission 105 was operating in the second gear 155 of the gear means 111, the controller 100 would partially engage the clutch 108 and instruct the gear means 109 to engage the third gear 152 since it is the only gear in the gear means 109 which is higher than the second gear 155.

Continuing with the original example, partially engaging the offline clutch 110 results in an increased load torque on the engine 102 and reduced wheel spin. The decision process and computational steps taken by the controller 100 are shown and described in further detail in U.S. Pat. No. 5,020,622 which issued to Hrovat, is assigned to the assignee of the present application and is incorporated herein by reference.

The controller 100 may actuate the solenoids 160 and 161 for partially engaging the clutches 108 and 110, respectively. The signals $P_1$ and $P_2$, which may be pulse width modulated, are generated by the controller 100, in response to the detected wheel spin, and transmitted to the appropriate solenoid 160 or 161 to partially engage the offline clutch.

Clutch wear can be significantly reduced by simultaneously decreasing the output of the engine 102 and partially engaging the offline clutch when wheel spin is recognized by the controller 100. As noted previously, the sensor 136 monitors the absolute manifold pressure of the intake manifold 112 of the engine 102 and generates pressure signals MAP which are proportional thereto. The controller 100 receives the pressure signals MAP and controls the engine 102 in response to the MAP signals and the detected wheel spin to reduce engine torque by regulating individually or in combination the throttle 115 coupled to a conventional fuel control system of the engine 102, a spark advance controller 119 coupled to a conventional ignition system of the engine 102 or a fuel injection pulse width controller 118 coupled to a conventional fuel control system of the engine 102.

Figure 2A:
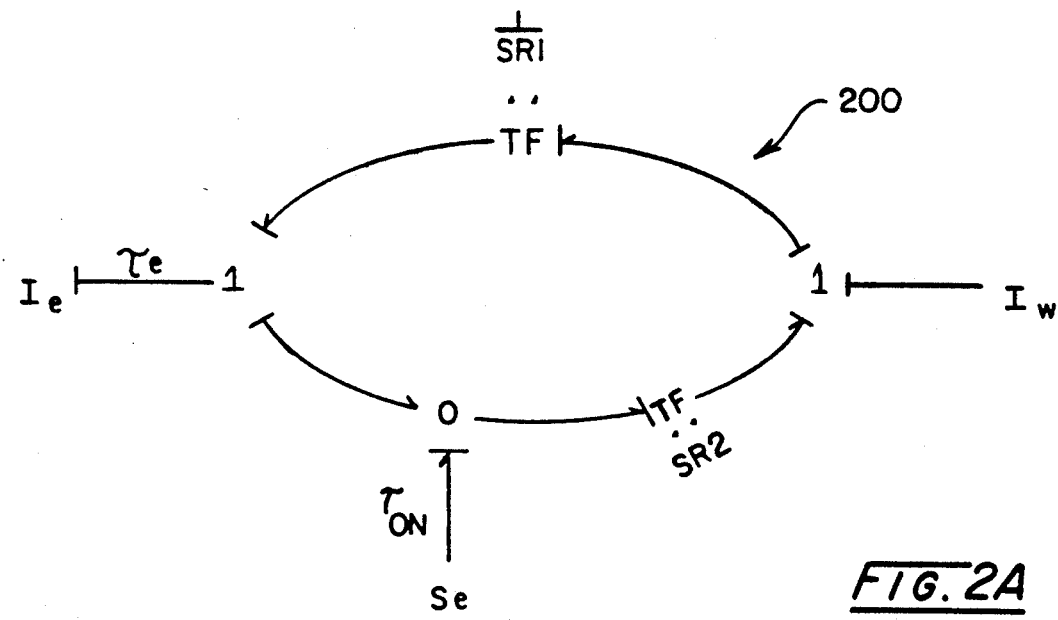
FIGS. 2A and 2B show simplified bond graph models for two alternate operations of the wheel spin control system of FIG. 1.

Referring now to FIG. 2A, a simplified bond graph 200 is shown representing the torque transfers occurring during the operation of the present invention in the embodiment described above. In the bond graph 200 of FIG. 2A, $I_e$ represents inertia of the engine, $S_e$ represents the engine as a source of torque, $\tau_{on}$ is the torque applied by the online clutch, $\tau_{of}$ is the torque applied by the offline clutch and $I_w$ is the inertia of the driven wheel(s). It should be appreciated that from the simplified model of FIG. 1 and the bond graph 200 of FIG. 2A, partially engaging the offline clutch results in an increased engine load torque $\tau_{EL}$ of:

$$\Delta \tau_{EL} = [1-(SR2/SR1)]\Delta \tau_{of} + [J_w/(SR1)^2]\Delta \omega_e$$

where $\Delta$ indicates change in the corresponding quantities and $\omega_{on}$ = output speed of the online clutch
$\omega_{of}$ = output speed of the offline clutch
$\omega_o$ = wheel speed
$\omega_e$ = engine speed
$SR1 = \omega_{on}/\omega_o$ = overall speed ratio in the currently operational gear
$SR2 = \omega_{of}/\omega_o$ = overall speed ratio in the higher gear transferring the torque through the partially engaged clutch
$J_w$ = total driven wheel inertia This increase in engine load is particularly significant for operations on low coefficient of friction ($\mu$) surfaces where, due to low speeds and loads, engine response is typically very slow. The present invention increases substantially the speed of response by increasing engine load through the engagement of the offline clutch.

The wear of clutches 108 and 110 can be further reduced by employing a timer 143 or temperature sensors 141 and 142 shown in FIG. 1 to disengage the partially engaged clutch after a predetermined time period or when the clutch reaches a certain temperature. For example, when the controller 100 partially engages the offline clutch, the timer 143 coupled to the controller 100 is activated. After a predetermined period of time that can result from an online model simulation, the timer 143 discontinues the clutch engagement signal from the controller 100 and the partially engaged clutch is disengaged. Additionally, thermal sensors 141 and 142, coupled to the controller 100 and the clutches 108 and 110, monitor the temperature of the clutches 108 and 110, respectively. The thermal sensors 141 and 142 generate signals T1 and T2 proportional to the temperature of the clutches 108 and 110. Controller 100 receives the signals T1 and T2 and disengages the partially engaged clutch when the clutch reaches a predetermined temperature. By disengaging the partially engaged clutch after a predetermined time period or upon reaching a certain temperature, clutch wear is reduced and the useful life of the clutches 108 and 110 is increased.

Another embodiment of a wheel spin control system in accordance with the present invention comprises partially engaging both clutches 108 and 110 upon detection of wheel spin by the controller 100, see FIG. 1. Wheel speed sensors 120 and 121 monitor the rotational speed of the driven wheels 103 and 104. Upon detection of wheel spin, the controller 100 reduces the hydraulic pressure applied to the online clutch transferring torque to the driven wheels 103 and 104 and thereby causes the clutch to slip. The controller 100 also partially engages the other, or offline, clutch and instructs the gear means of the offline clutch to engage a gear higher than the currently operational gear. Consequently, both clutches are partially engaged substantially simultaneously to reduce wheel spin.

Figure 2B:
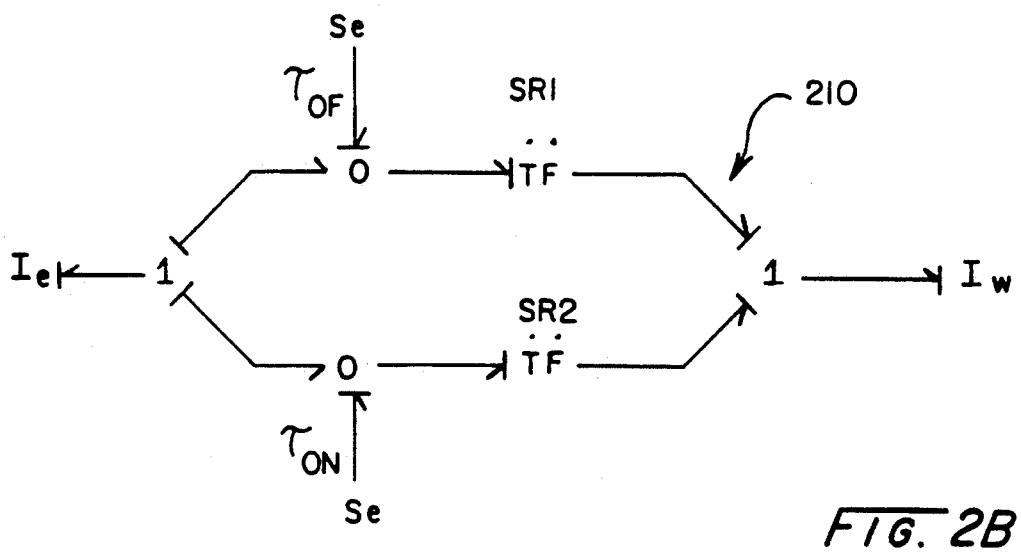

This situation would typically occur during driveaways when under normal conditions, on a high $\mu$ surface, the online clutch is slipping and the engine speed $\omega_e$ is above the online clutch output speed. If during driveaway a low $\mu$ surface is encountered, the controller 100 partially engages the offline clutch to contain the wheel spin and the output speed of clutches 108 and 110 will both be below engine speed $\omega_e$. This situation is depicted by the bond graph 210 of FIG. 2B where $I_e$ is engine inertia, $S_e$ represents the engine as a source of torque, $\tau_{on}$ is the torque applied by the online clutch, $\tau_{of}$ is the torque applied by the offline clutch and $I_w$ is inertia of the driven wheel(s). Since the offline clutch acts upon the driven wheels 103 and 104 through a smaller speed ratio, the wheel speed is quickly reduced.

In a situation where dual clutch control is used to reduce wheel spin during non-driveaway operation of the vehicle 101, the controller 100 partially engages both the online clutch and the offline clutch. However, in order to maintain a positive torque on the driven wheels 103 and 104, the engine speed $\omega_e$ is pulled and maintained below the output speed of the online clutch $\omega_{on}$. Thereafter, both clutches control the wheel spin. This situation is also shown in the bond graph 210 of FIG. 2B with $SR1 < 0$.

Figure 3A:
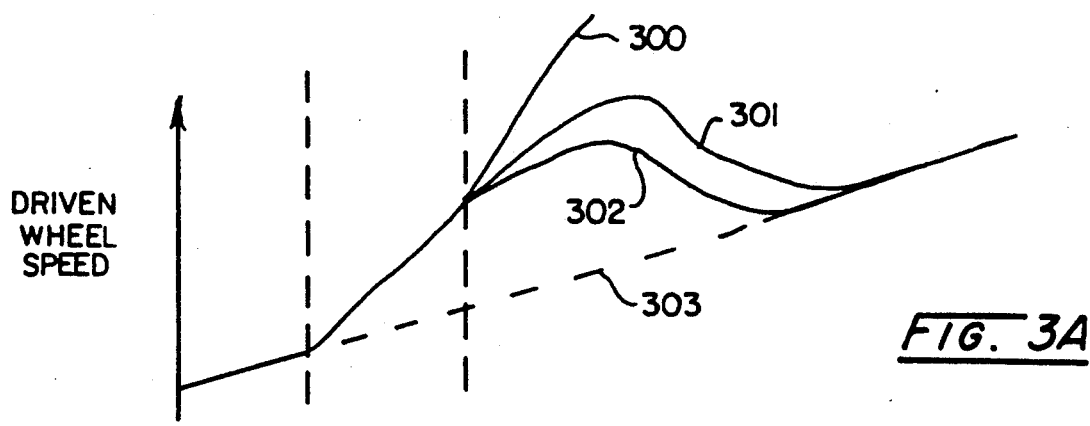
FIGS. 3A, 3B and 3C show graphical representations of the response time of the embodiments of the present invention with regard to driven wheel speed, torques and engine speed, respectively.
Figure 3B:
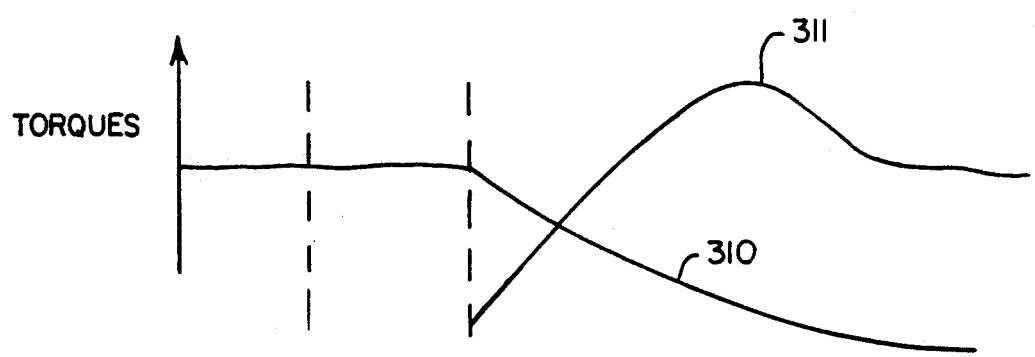
Figure 3C:
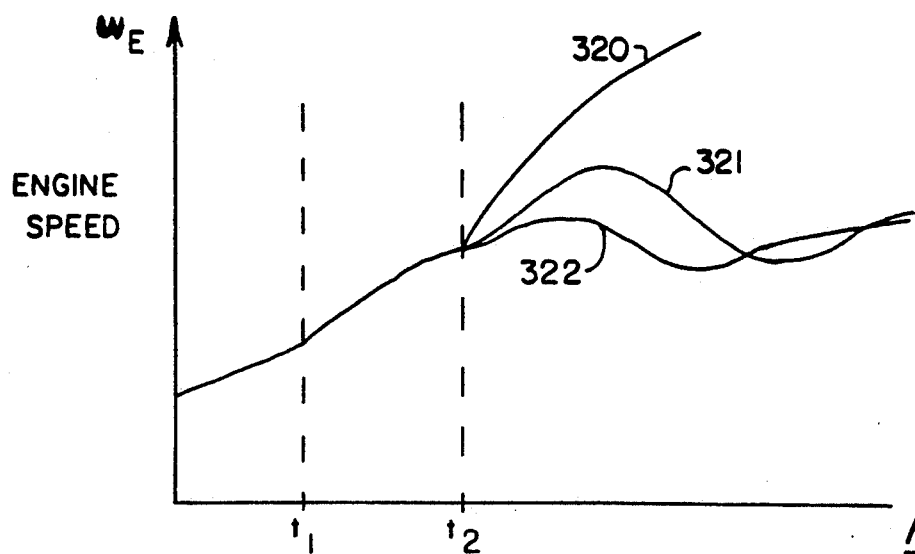

A graphical representation of the response of the above described embodiments is shown in FIGS. 3A through 3C. Referring to FIG. 3A, an illustrative example is shown wherein the motor vehicle 100 encounters a low $\mu$ surface during normal operation. At time $t_1$, the driven wheel speed is shown abruptly accelerating as the driven wheels 103 and 104 begin to accelerate beyond the allowable value. Curve 300 illustrates the driven wheel speed without the wheel spin control system of the present invention. With the present invention, the controller 100 responds to the detected wheel spin at time $t_2$ by partially engaging the offline clutch, thereby increasing the torque applied to the engine 102, as shown in FIG. 3B by curve 311, and decreasing the driven wheel speed, as shown in FIG. 3A by curve 301.

Further, as shown by curve 302, reducing engine torque as represented by curve 310 in addition to partially engaging the offline clutch results in an even faster response and a closer approximation to the desired wheel speed curve 303.

Continuing with FIGS. 3A through 3C, with particular reference to FIG. 3C, it is seen that engine speed $\omega_e$ begins to increase rapidly when a low $\mu$ surface is encountered by the driven wheels 103 and 104 at time $t_1$. This rapid increase in engine speed $\omega_e$ is reduced by the wheel spin control system of the present invention. Without the wheel spin control system described herein, engine speed would continue along the curve 320. However, the controller 100 prevents this increase in engine speed $\omega_e$ and results in engine operation as depicted by curve 321, in the case where the offline clutch is partially engaged, or by curve 322, in the case where the offline clutch and engine 102 are regulated in combination.

Having thus described the wheel spin control system of the present invention in detail and by reference to preferred embodiments thereof, it will be apparent that modifications and variations are possible without departing from the scope of the invention defined in the appended claims.

What is claimed is:

1. A wheel spin control system for a vehicle having an engine including an intake manifold, a transmission including first and second gear means and first and second clutch means, and at least one wheel driven through one of said first and second gear means and one of said first and second clutch means, said first gear means being operational when said first clutch means is engaged and said second gear means being operational when said second clutch means is engaged, the system comprising:
    first sensor means for monitoring said at least one driven wheel and for generating a spin signal indicative of wheel spin;
    means for monitoring said first and second gear means and for generating gear signals indicative of operation of one of said first and second gear means and thereby the engagement of one of said first and second clutch means; and
    controller means responsive to said gear signals and said spin signal for partially engaging the other one of said first and second clutch means which is not engaged when said spin signal indicates wheel spin while maintaining the full engagement of said one of said first and second clutch means which is engaged to increase load torque on said engine and thereby reduce wheel spin.

2. A wheel spin control system as recited in claim 1 wherein said controller means includes a first solenoid and a second solenoid for partially and fully engaging said first and second clutch means, respectively, said controller means generating a pulse width modulated signal for controlling said first and second solenoids.

3. A wheel spin control system as recited in claim 1 further comprising:
    second sensor means for monitoring said engine and for generating engine signals indicative of a first operating condition of said engine; and
    means for controlling said engine in response to said engine signals and said spin signal to regulate a second operating condition of said engine and thereby reduce wheel spin.

4. A wheel spin control system as recited in claim 3 wherein said means for controlling said engine comprises an electronically-controlled throttle coupled to a fuel control system of said engine.

5. A wheel spin control system as recited in claim 3 wherein said means for controlling said engine comprises a spark advance system coupled to an ignition system of said engine.

6. A wheel spin control system as recited in claim 3 wherein said means for controlling said engine comprises a fuel injection pulse width control system coupled to a fuel control system of said engine.

7. A wheel spin control system as recited in claim 3 wherein said first operating condition of said engine is absolute pressure of said intake manifold of said engine, said manifold absolute pressure being monitored by said second sensor means and being used by said means for controlling said engine.

8. A wheel spin control system as recited in claim 1 further comprising timer means coupled to said controller means for disengaging the one of said first and second clutch means which is partially engaged after a predetermined period of time of partial engagement.

9. A wheel spin control system as recited in claim 1 further comprising thermal means coupled to said controller means for monitoring temperatures of said first and second clutch means, said controller means further providing for disengaging the one of said first and second clutch means which is partially engaged upon reaching a predetermined temperature.

10. A wheel spin control system as recited in claim 1 wherein said first sensor means further provides for monitoring at least one nondriven wheel of said vehicle.

11. A wheel spin control system as recited in claim 1 wherein said first sensor means further provides for monitoring at least one nondriven wheel of said vehicle and generates said spin signal by comparing the average rotational speed of said driven wheels being monitored by said first sensor means and the average rotational speed of said nondriven wheels being monitored by said first sensor means.

12. A wheel spin control system as recited in claim 1 wherein said controller means further provides for comparing said spin signal and a predetermined maximum spin value and for partially engaging the other one of said first and second clutch means which is not engaged when said spin signal indicates wheel spin upon said spin signal exceeding said predetermined maximum spin value.

13. A wheel spin control system as recited in claim 1 further comprising pressure sensor means for monitoring hydraulic pressure being applied to said first and second clutch means and generating a pressure signal indicative of said hydraulic pressure, said pressure signal being used by said controller means for partially engaging the other one of said first and second clutch means which is not engaged when said spin signal indicates wheel spin.

14. A wheel spin control system for a vehicle having an engine, a multiple clutch transmission including at least first and second clutch means, at least one wheel driven through said transmission, the system comprising:
    first sensor means for monitoring said at least one driven wheel and for generating a spin signal indicative of wheel spin;
    gear indicator means for monitoring said transmission and for generating gear signals indicative of the currently operational gear of said transmission driving said at least one driven wheel; and controller means responsive to said gear signals and said spin signal for partially engaging said first and second clutch means when said spin signal indicates wheel spin to increase load torque on said engine and thereby reduce wheel spin.

15. A wheel spin control system as recited in claim 14 further comprising:

second sensor means for monitoring said engine and for generating engine signals indicative of a first operating condition of said engine; and means for controlling said engine in response to said engine signals and said spin signal to regulate a second operating condition of said engine and thereby reduce wheel spin.

16. A wheel spin control system as recited in claim 14 wherein said first sensor means further provides for monitoring at least one nondriven wheel of said vehicle.

17. A wheel spin control system as recited in claim 14 wherein said first sensor means further provides for monitoring at least one nondriven wheel of said vehicle and generates said spin signal by comparing the average rotational speed of said driven wheels being monitored by said first sensor means and the average rotational speed of said nondriven wheels being monitored by said first sensor means.

18. A wheel spin control system as recited in claim 15 wherein said means for controlling said engine further comprises a throttle means coupled to a fuel system of said engine.

19. A wheel spin control system as recited in claim 15 wherein said means for controlling said engine comprises a spark advance system coupled to an ignition system of said engine.

20. A wheel spin control system as recited in claim 15 wherein said means for controlling said engine comprises a fuel injection pulse width control system coupled to a fuel control system of said engine.

21. A method for controlling wheel spin of a vehicle having an engine, a transmission including first and second gear means and first and second clutch means, and wheels driven through one of said first and second gear means and one of said first and second clutch means, said first gear means being operational when said first clutch means is engaged and said second gear means being operational when said second clutch means is engaged, the method comprising the steps of:

generating spin signals indicative of wheel spin;

generating gear signals indicative of operation of one of said first and second gear means and thereby the engagement of one of said first and second clutch means;

maintaining the full engagement of said one of said first and second clutch means which is engaged; and partially engaging the other one of said first and second clutch means which is not engaged in response to said spin signals and said gear signals to increase load torque on said engine and thereby reduce wheel spin.

22. A method for controlling wheel spin of a vehicle as recited in claim 21 further comprising the steps of:

generating engine signals indicative of an operating condition of said engine; and controlling said operating condition of said engine in response to said spin signals and said engine signals to reduce wheel spin.

23. A method for controlling wheel spin of a vehicle as recited in claim 22 wherein said operating condition of said engine is engine speed.

24. A method for controlling wheel spin of a vehicle having an engine, a transmission including first and second gear means and first and second clutch means, and wheels driven through one of said first and second gear means and one of said first and second clutch means, said first gear means being operational when said first clutch means is engaged and said second gear means being operational when said second clutch means is engaged, the method comprising the steps of:

generating spin signals indicative of wheel spin;

generating gear signals indicative of the currently operational gear of said transmission driving said wheels and thereby the engagement of one of said first and second clutch means; and partially engaging said first and second clutch means in response to said spin signals and said gear signals to increase load torque on said engine and thereby reduce wheel spin.

25. A method for controlling wheel spin of a vehicle as recited in claim 24 further comprising the steps of:

generating engine signals indicative of an operating condition of said engine; and controlling said operating condition of said engine in response to said spin signals and said engine signals to reduce wheel spin.

* * * * *